(12) United States Patent
Miller (10) Patent No.: US 7,305,546 B1
(45) Date of Patent: Dec. 4, 2007

(54) SPLICING OF TCP/UDP SESSIONS IN A FIREWALLED NETWORK ENVIRONMENT

(75) Inventor: Eric E. Miller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 843 days.

(21) Appl. No.: 10/230,914

(22) Filed: Aug. 29, 2002

(51) Int. Cl.
*H04L 9/00* (2006.01)
*G06F 15/16* (2006.01)
*G06F 17/00* (2006.01)

(52) U.S. Cl. .......................... 713/153; 713/154; 726/15
(58) Field of Classification Search ................... 726/15
See application file for complete search history.

(56) References Cited

U.S. PATENT DOCUMENTS

| | | | |
|---|---|---|---|
| 5,828,833 A | 10/1998 | Belville et al. | |
| 5,867,494 A * | 2/1999 | Krishnaswamy et al. | 370/352 |
| 5,999,525 A * | 12/1999 | Krishnaswamy et al. | 370/352 |
| 6,088,796 A | 7/2000 | Cianfrocca et al. | |
| 6,233,688 B1 | 5/2001 | Montenegro | |
| 6,335,927 B1 * | 1/2002 | Elliott et al. | 370/352 |
| 6,339,830 B1 * | 1/2002 | See et al. | 726/15 |
| 6,731,625 B1 * | 5/2004 | Eastep et al. | 370/352 |
| 6,751,729 B1 * | 6/2004 | Giniger et al. | 713/153 |
| 6,754,181 B1 * | 6/2004 | Elliott et al. | 370/252 |
| 6,909,708 B1 * | 6/2005 | Krishnaswamy et al. | 370/352 |
| 6,931,529 B2 * | 8/2005 | Kunzinger | 713/153 |
| 6,957,346 B1 * | 10/2005 | Kivinen et al. | 713/153 |
| 7,167,920 B2 * | 1/2007 | Traversat et al. | 709/230 |
| 2002/0064149 A1 * | 5/2002 | Elliot et al. | 370/352 |

OTHER PUBLICATIONS

Dumbill, Edd. "XML Watch: Bird's-eye BEEP". Dec. 1, 2001. Found on the website—http://www128.ibm.com/developerworks/xml/library/x-beep/index.html.*
Comer, Douglas E. Internetworking with TCP/IP Principles, Protocols, And Architectures. Prentice Hall. Fourth Edition. pp. 213-216.*
Comer, Douglas E. "Internetworking with TCP/IP Principles, Protocols, And Architectures". Prentice Hall. Fourth Edition. pp. 213-216.*
Patton, Samuel. Doss, David. Yurick, William. "Distributed Weaknesses in Virtual Private Networks". Proceeding 25th Annual IEEE Conference Nov. 8-10, 2000. pp. 96 and 97. Found on the World Wide Web at: http://ieeexplore.ieee.org/iel5/7152/19253/00891014.pdf?tp=&arnumber=891014&isnumber=19253.*
Chang, Rocky K.C. Fung, King P. "Transport Layer Proxy for Stateful UDP Packet Filtering". Computers and Communications, 2002. Proceedings, ISCC 2002. Jul. 4-12, 2002. pp. 595-600. Found on the World Wide Web at: http://ieeexplore.ieee.org/iel5/7956/21983/01021735.pdf?tp=arnumber=1021735&isnumber=21983.*

* cited by examiner

Primary Examiner—Gilberto Barron
Assistant Examiner—Jeremiah Avery (57) ABSTRACT

Computer peers located behind respective firewalls create special network sessions with a central mediator/translator or socket welder so that the peers can run applications that utilize the transmission of unsolicited data packets to each other through their respective firewalls. For example, two home networking users can dynamically connect to each other for the purpose of exchanging real-time data or communications, or a mobile enterprise user can access, in real-time, firewalled computing resources while the mobile user is outside of the firewalled enterprise environment. The firewall is maintained unaltered for continued protection from unauthorized network traffic while achieving an inexpensive and very secure system for splicing together multiple, firewall-compliant network sessions via the socket welder.

28 Claims, 8 Drawing Sheets

SPLICING OF TCP/UDP SESSIONS IN A FIREWALLED NETWORK ENVIRONMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to interactive communication sessions within computer networks, and, more specifically, to maintaining such a session between two peer computers wherein one or both of the computers are coupled to the computer network through a firewall.

Much attention has been directed to computer internet-working problems of hacking, virus attacks, availability of unsuitable content, and other security issues. As each type of problem has developed, protective security tools have arisen to allow computers to be protected from attacks and to supervise how the computers can interact with the internet-work (e.g., Internet).

Today, most enterprise and home networks use some form of firewall or proxy server to block TCP/UDP connections initiated outside of the firewalled network environment. Blocking of particular packets within user traffic directed through the firewall can be performed based on several different criteria, such as IP address where the traffic originated, domain names of the source or destination of the traffic, the protocol in which the traffic is formatted, and the port sending or receiving the traffic, among others. Firewalls can also perform proxy services or perform network address translation (NAT) so that a particular computer is not directly accessible from outside the firewall.

One typical type of firewall operates as a router at the network service level to interface between a protected device and remote devices. The firewall filters out (i.e., discards) packets directed to the firewall in response to predetermined rules. Most often, rules are set up to discard packets based on the source and destination addresses and ports (i.e., sockets) or specific IP transport protocol types of packets. Since network/computer owners frequently deploy a firewall for the purpose of preventing outside access to internal computer resources, a typical set of rules may allow only connection sessions that are initiated by a computer behind the firewall. In other words, all incoming traffic may be blocked by the firewall except incoming packets wherein the source and destination addresses match those of prior outgoing packets. For instance, a firewall may maintain a table of source/destination addresses and ports of recent, outgoing packets. When an incoming packet is received, the addresses and ports are compared to the table and if matching source/destination addresses and ports are found then the incoming packet is in response to an internal request and it is forwarded through the firewall. If no match is found, then the packet is rejected.

Due to this exclusion of packets that are not specifically received in response to a requesting packet from inside the firewall, a computer user is prevented from using certain types of desirable network applications. For example, many legitimate applications employ spontaneous transmission of data and/or control signals such as audio and video conferencing, streaming multimedia, instant messaging, and on-line gaming. A firewall configured in this manner also prevents an authorized user from gaining remote access to a protected computer or network (e.g., an employee accessing a company's intranet from the Internet while traveling) unless modified with additional hardware and/or software, such as a virtual private network (VPN), to circumvent or tunnel through the firewall. Such a modification, however, may require specific protocols and cannot generically handle most applications. Furthermore, VPN solutions will not allow two users to communicate directly with each other through a firewall.

SUMMARY OF THE INVENTION

The present invention allows a computer (i.e., peer) located behind a firewall to create special network sessions to enable applications that utilize the transmission of unsolicited data packets from outside the firewall. For example, two home networking users can dynamically connect to each other for the purpose of exchanging real-time data or communications, or a mobile enterprise user can access, in real-time, firewalled computing resources while the mobile user is outside of the firewalled enterprise environment. The invention has the advantages of maintaining the firewall unaltered for continued protection from unauthorized network traffic while providing an inexpensive and very secure system for splicing together multiple, firewall-compliant network sessions via a central mediator/translator (referred to herein as a socket welder).

In one aspect of the invention, a method is provided for peer-to-peer communication over a data network wherein first and second peers are coupled to the data network by respective firewalls. Each of the first and second peers establishes a respective persistent control connection with a socket welding control module connected within the data network. Persistent connections are used to perform respective protocol capability exchanges. One of the first and second peers uses the respective persistent control connection to request a communication channel between the peers. The socket welding control module informs a socket welder of addresses, ports, and protocol capabilities corresponding to the peers. The socket welding control module informs the peers of connection information corresponding to the socket welder. Each peer sends application packets through its respective firewall to the socket welder. The socket welder modifies and forwards the application packets to the other peer.

DETAILED DESCRIPTION OF PREFERRED EMBODIMENTS

Figure 1:
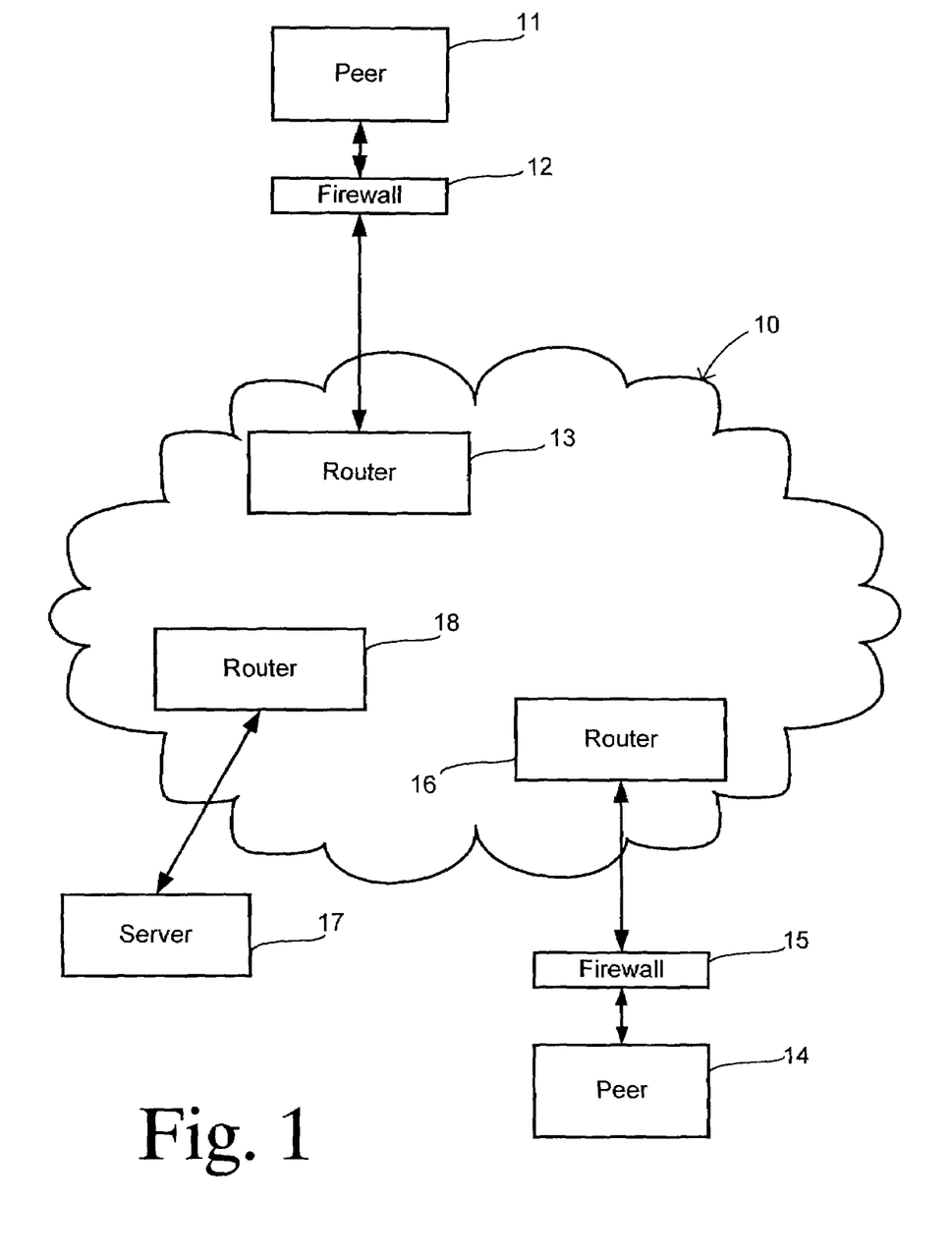
FIG. 1 is a block diagram showing a computer network for implementing the present invention.

Referring to FIG. 1, an internetwork 10 may preferably comprise the global Internet. A first peer computer 11 is coupled via a firewall 12 to a router 13 connected within Internet 10. A second peer computer 14 is coupled via a firewall 15 to a router 16 also connected within Internet 10. In the context of home networks, firewalls 12 or 15 may comprise a software application running on the peer computer or may be included in a local gateway/router connected to a cable modem or a DSL modem, for example. In the context of an enterprise network, firewalls 12 or 15 may be implemented as a software application running on a separate server (e.g., a Netra™ t1125 server available from Sun Microsystems running FireWall-1® software available from Check Point Software Technologies, Ltd.). A server 17 is coupled to a router 18 without a firewall for performing the function of a socket welder as described below.

If neither firewall was present, then peers 11 and 14 would be able to run applications that spontaneously exchange data or control signals (e.g., video conferencing, instant messaging, and interactive video games). Peers behind firewalls, however, will only be able to initiate outbound connections through the firewall and an inbound connection will be ignored. The firewall, by design, blocks any new connection attempts that are coming in from the Internet and only allows traffic coming in that is already associated with a previous out-bound connection. Since firewalls block new in-bound connection attempts, an authorized peer (Origin Peer) outside another peer's (Terminus Peer) firewall would not be able initiate a connection to that peer (Terminus Peer) without both peers supporting some type of Virtual Private Network (VPN) hardware. The present invention provides a socket welder (e.g., implemented in server 17) to allow these peers to initiate secure connections to each other while both are behind firewalls.

Figure 2:
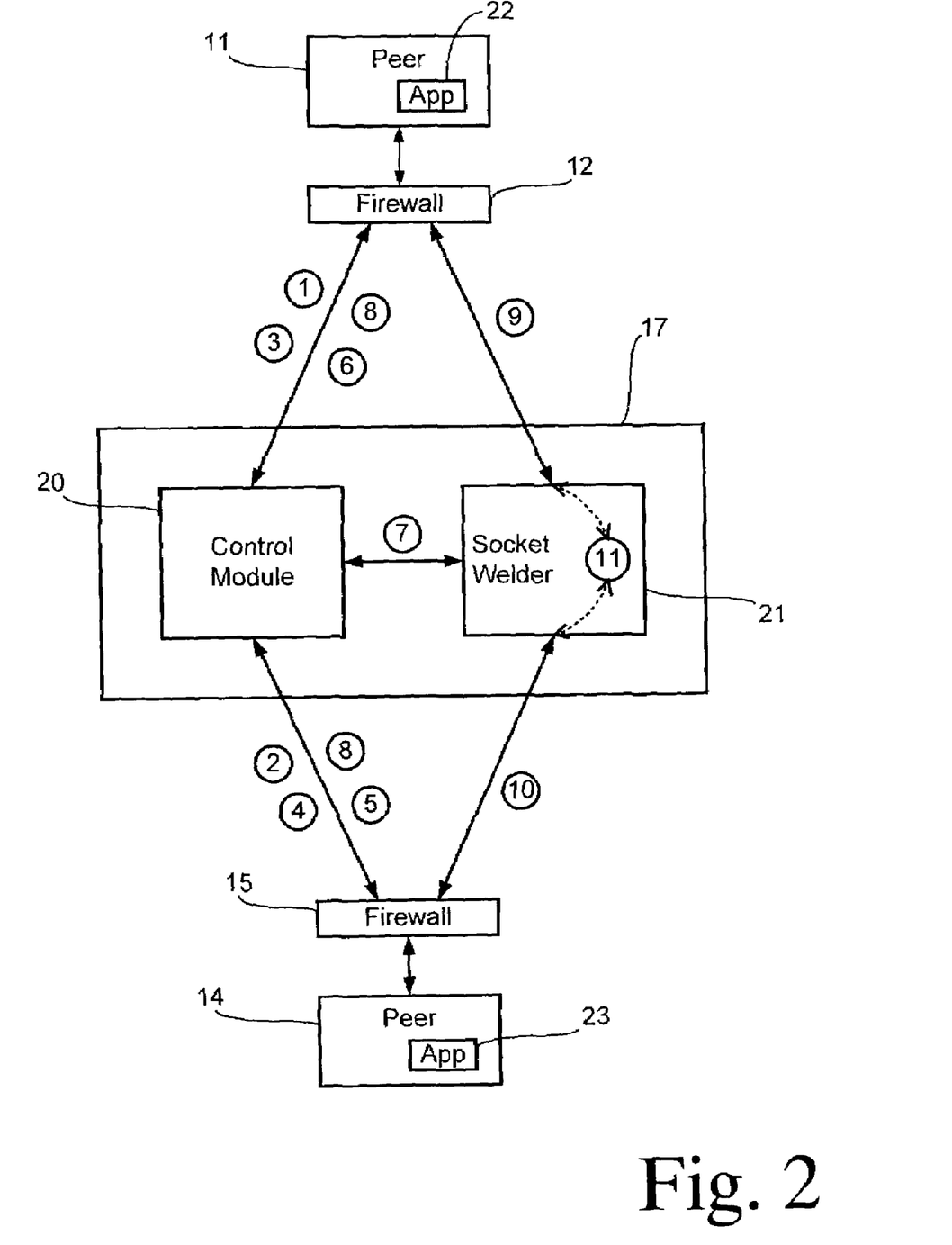
FIG. 2 is a block diagram showing specific network elements and their interaction in a first embodiment of the invention.

As shown in FIG. 2, server 17 preferably comprises a control module 20 and a socket welder 21, each of which may be implemented using a programmed general purpose processor and/or customized hardware. Peers 11 and 14 include software applications 22 and 23 for interacting with control module 20 and socket welder 21 as described below. Applications 22 and 23 may comprise pre-installed software or may comprise applets, such as Java code, which is downloaded and run only when the socket welding service of the present invention is accessed. The main functions of applications 22 and 23 include establishing persistent connections with control module 17, performing a capabilities exchange with control module 17, and setting up and using a spliced data channel between peers.

FIG. 2 shows a series of interactions that take place in a preferred embodiment. At interaction #1, origin peer 11 connects to control module 20 and completes a capabilities exchange. Similarly, at interaction #2, terminus peer 14 connects to control module 20 and completes a capabilities exchange. Origin peer 11 sends a first CONNECT/REQUEST message to control module 20 at interaction #3. This message contains the identity of terminus peer 14 and any special connection information that may be needed by control module 20. At interaction #4, control module 20 forwards a second CONNECT/REQUEST message to terminus peer 14, the message preferably including the identity of origin peer 11.

At interaction #5, a user at peer 14 decides to accept the connection and manipulates application 23 so that a CONNECT/ACCEPT message is sent to control module 20. The CONNECT/ACCEPT message is forwarded to peer 11 at interaction #6.

Based on the socket (i.e., IP address and port number) information and authentication information associated with each peer, control module 20 sends the impending connection information to socket welder 21 at interaction #7. At interaction #8, control module 20 sends CONNECT/START messages to peers 11 and 14 providing an IP address and TCP port to be used in establishing persistent connections with socket welder 21 for being spliced together. At interactions-#9 and #10, peers 11 and 14, respectively, initiate connections to socket welder 21 using the information supplied in the CONNECT/START messages. Since these connections are initiated internally of firewalls 12 and 15, they are permitted by the firewalls. For a series of ongoing transactions #11, socket welder 21 receives network packets from peers 11 and 14 and performs TCP re-sequencing, fragmentation or re-assembly, IP address translation, and TCP window re-sizing as needed prior to forwarding the modified packets on to the other peer using the persistent connection previously initiated by that peer.

TCP message packets include sequence numbers to assist a receiving computer to reassemble data packets in the correct order and to limit IP address spoofing. An initial sequence number for a connection session is chosen at random. Since two separate sessions (initiated separately by each peer to the socket welder) must be spliced together, the socket welded cannot merely translate the IP addresses and forward a packet. The sequence number must also be changed to what is expected by the peer to receive the packet. Fragmentation, re-assembly, or window re-sizing may be required according to the distinct protocols being used in each half of a spliced connection. For encrypted data sessions, the socket welder may also decrypt and re-encrypt the data.

Figure 3:
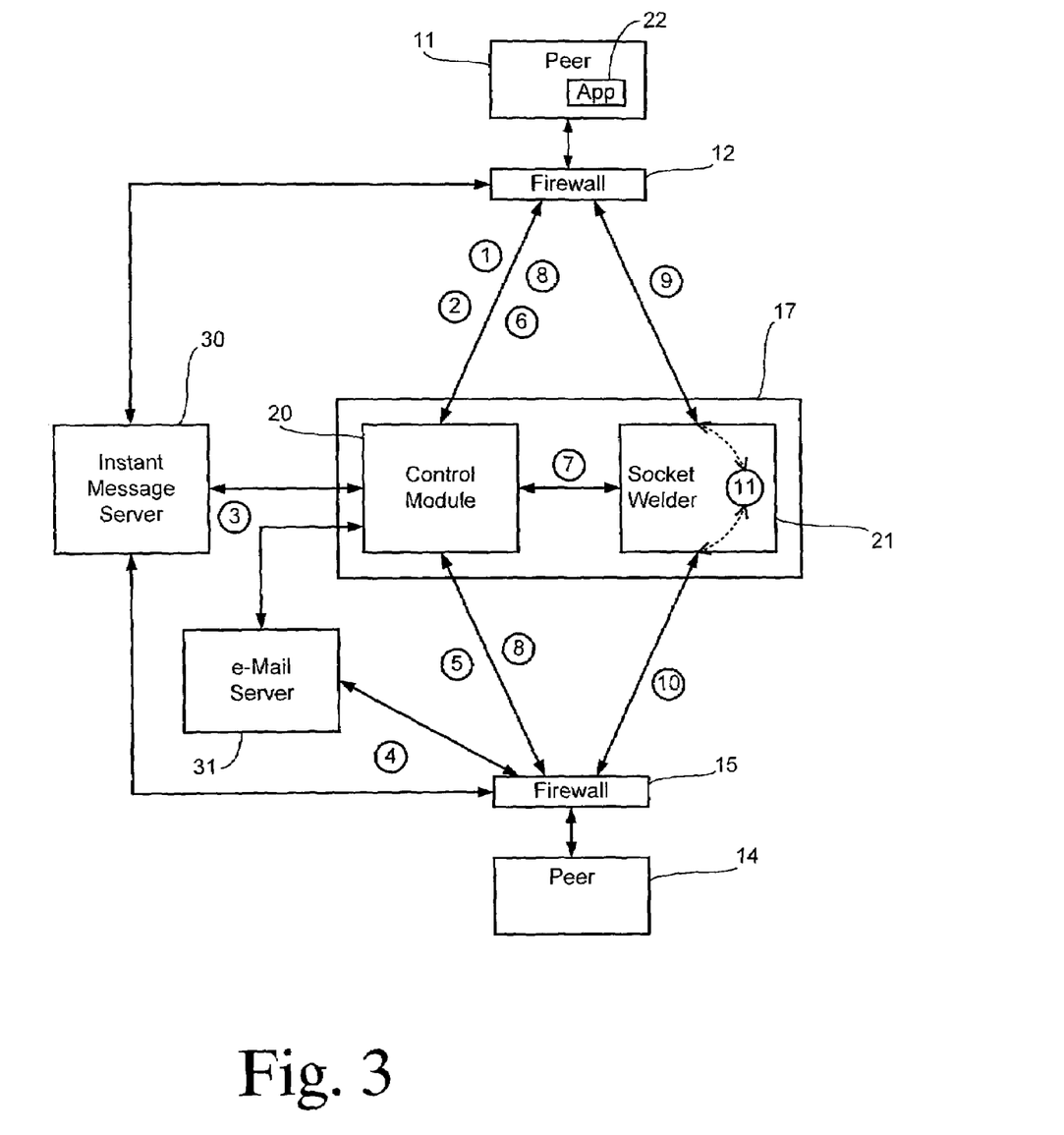
FIG. 3 is a block diagram showing specific network elements and their interaction in a second embodiment of the invention.

In the embodiment of FIG. 2, each peer initiates a persistent connection with control module 20 independently and in advance of a connection request. FIG. 3 shows an alternative embodiment wherein peer 14 does not have an advance connection with control module 20 at the time that peer 11 desires to establish a communication session with peer 14. An out-of-band signaling application such as those provided by an instant messaging server 30 or an e-Mail server 31 to which peer 14 is connected (at an address that is known to peer 11) is used to inform peer 14 of peer 11's request and the information needed to connect with control module 20.

As shown by FIG. 3, origin peer 11 connects to control module 20 and completes a capabilities exchange at interaction #1. At interaction #2, origin peer 11 sends a first CONNECT/REQUEST message to control module 20. This message contains the identity of terminus peer 14 and connection information for completing the out-of-band signaling connection (e.g., the intended recipient's identity as assigned by instant messaging server 30 or e-Mail server 31). At interaction #3, control module 20 forwards a second CONNECT/REQUEST message to the out-of-band server (e.g., an instant message or an e-Mail message). The CONNECT/REQUEST message includes the identity of origin peer 11 and details (e.g., a link) on how to initiate a connection with control module 20. Peer 14 receives the out-of-band message at interaction #4 (not necessarily in real time), and then the user determines whether they will connect with peer 11. If a connection is sought, then peer 14 connects with control module 20 at interaction #5, completes a capabilities exchange, and sends a CONNECT/ACCEPT message. Thereafter, operation of this embodiment is the same as interactions #6-#11 of FIG. 2.

Figure 4:
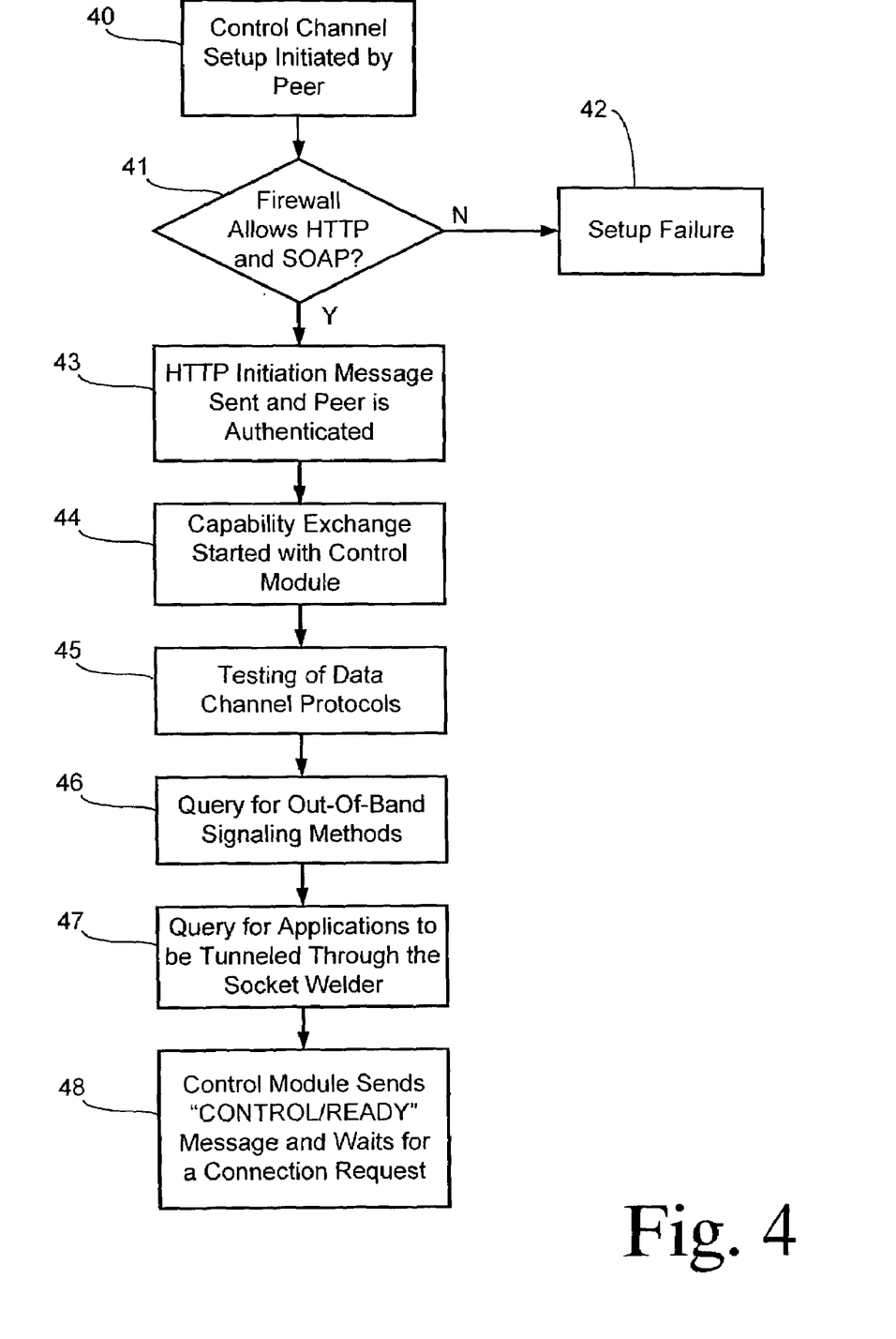
FIG. 4 is a flowchart showing a preferred embodiment of a method for setting up a control channel between a peer and a socket welder system.

A preferred method for setting up a control channel between a peer and the control module is shown in greater detail in FIG. 4. The control module is a web server that provides authentication and socket welding control services to the peers and provides connection setup information to the socket welder. Before a peer can make socket welder connections to other peers, it must first establish a persistent HTTP connection to the socket welder control module and complete a capabilities exchange. This capabilities exchange ensures the best possible connection to the socket welder for a given firewall configuration. The exchange uses SOAP encoded messages with HTTP as a transport.

In step 40, a user initiates a control channel connection with the control module (either on their own initiative or in response to an out-of-band notification). The initiation and use of the socket welding service employ a custom software application as described earlier. In step 41, the software application checks whether the firewall associated with the peer allows outgoing HTTP and SOAP protocols. HTTP is used because it is allowed through by most firewall configurations. SOAP (Simple Object Access Protocol) allows different operating systems to exchange HTTP messages. If the firewall does not allow these messages, then a setup failure is indicated in step 42. Otherwise, the peer initiates an HTTP connection with the control module. An initiation message is sent in step 43 and further messages are exchanged in order to authenticate the peer. Authentication uses SOAP/SAML (Security Assertions Markup Language) messages and TLS (Transport Layer Security). During authenticated, the control module stores the peer's IP address, identity, and other usage information for setting up future communication sessions through the socket welder.

After authentication, the capabilities exchange is started by the peer sending a CONTROL/INITIALIZE message to the control module in step 44. Testing of available data channel protocols is performed in step 45. The control module responds to the CONTROL/INITIALIZE message by sending a CONTROL/TEST/QUERY message which requests the peer to send a protocol test packet in a particular protocol that is specified in the message. The peer sends a CONTROL/TEST/START message to acknowledge that the CONTROL/TEST/QUERY message was received and that the next packets to be sent by the Peer will be of the protocol type specified in the CONTROL/TEST/QUERY message. The peer then proceeds to send a test packet using the specified protocol and then sends a CONTROL/TEST/COMPLETE message to notify the control module that it has completed the transmission of the protocol test packet. If the control module received the protocol test packet, then it sends a CONTROL/TEST/SUCCESS message to the peer, otherwise a CONTROL/TEST/FAILURE message is sent.

The protocol tests are repeated until a CONTROL/TEST/SUCCESS results. A preferred data channel protocol is tested first with less desired protocols following in a ranked order. If the peer initiated the connection using TCP, then the ranked order is TCP/BEEP followed by TCP/HTTP/BEEP. BEEP (Blocks Extensible Exchange Protocol) is a secure protocol that can multiplex multiple application layer data sessions over a single TCP connection, which will allow several applications to be simultaneously spliced by the socket welder. If the peer cannot support BEEP directly, then BEEP over HTTP will be used. If the peer-initiated connection uses UDP, then the ranked order comprises UDP followed by TCP/BEEP/UDP followed by TCP/HTTP/BEEP/UDP. If UDP tests fail, the UDP can be tunneled through the TCP data channel, with a performance penalty.

After the control module has tested all of the data channel protocols, it queries the peer in step 46 for support for any out-of-band messaging methods (in the event that it later drops its direct connection to the control module) by sending a CONTROL/OOB/QUERY message. The peer responds with a CONTROL/OOB/RESPONSE message that contains a list of supported out-of-band messaging methods and the information that the Control Module would need to access (e.g., e-Mail address and/or instant messaging server address and user name).

In step 47, the control module queries the peer for the applications that it intends to tunnel through the socket welder by sending a CONTROL/APPS/QUERY message. The peer sends a CONTROL/APPS/RESPONSE message containing the applications that it would like to tunnel and their protocol information, e.g., TCP port, name, etc. The control module completes the control channel setup and capabilities exchange by sending a CONTROL/READY message in step 48. With the control channel having been set up between the peer and the control module, the peer will now be able to send data channel setup messages when it is ready to initiate socket welding connections.

Figure 5:
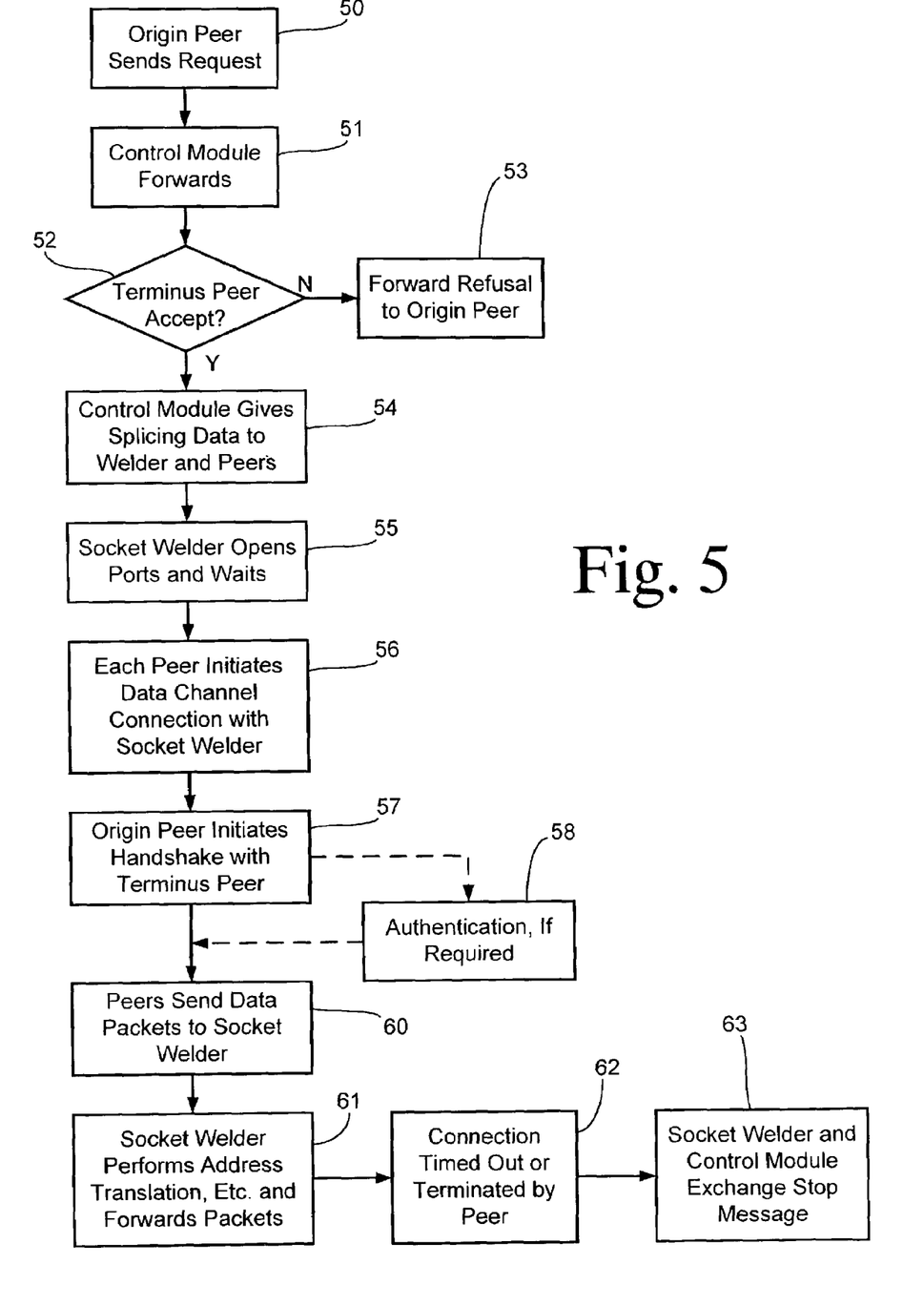
FIG. 5 is a flowchart showing a preferred method of establishing and using a data channel between peers through the socket welder of the present invention.

The setup and operation of a spliced data channel connection through the socket welder is shown in greater detail in FIG. 5. The socket welder is a hardware network appliance that accepts data channel connections from peers and performs translation operations to splice the original independent data channels together. The socket welder works in conjunction with the control module that authenticates the peers and forwards connection information to the peers and to the socket welder so that the socket welder performs as a central mediator/translator between the peers so that data generated spontaneously at one peer can be sent to the other peer even though a firewall in the receiving peer excludes all packets not being sent in response to an outgoing request.

In step 50, an originating peer has identified a terminating peer with which it desires to have a communication session and sends a first CONNECT/REQUEST message to the control module. The control module sends a second CONNECT/REQUEST message in step 51 to the terminus peer identified in the origin peer's request. A check is made in step 52 to determine whether the terminus peer accepted the connection request. If not, then the refusal is forwarded to the origin peer in step 53.

Figure 6:
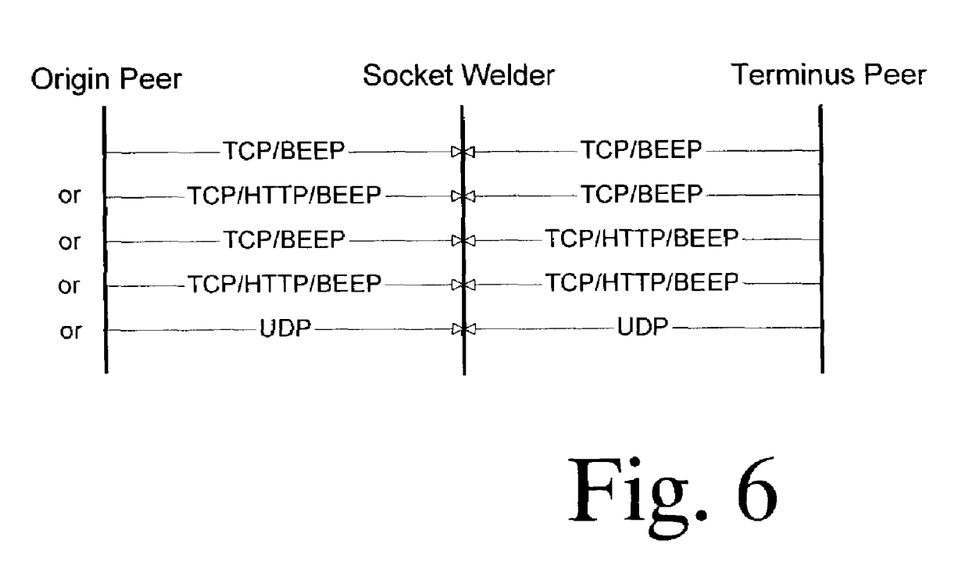
FIGS. 6-8 are signal diagrams illustrating various aspects of the invention.

If the connection request is accepted, then the control module forwards splicing data to the socket welder and the peers in step 54. A CONTROL/SPLICE/START message is sent to the socket welder containing the source IP addresses of the connections to be spliced, the protocol/port information for the spliced connection, as well as the data channel type that the peers will be using. In step 55, the socket welder uses the CONTROL/SPLICE/START message information to open its appropriate ports and then begins listening for packets from the peers. In step 56, each peer uses the socket welder address and port data to initiate a data channel connection to the socket welder (the type of connection was determined earlier during the capabilities exchange with the control module). The various possible combinations of protocols used by each portion of a spliced data connection are shown in FIG. 6.

Figure 7:
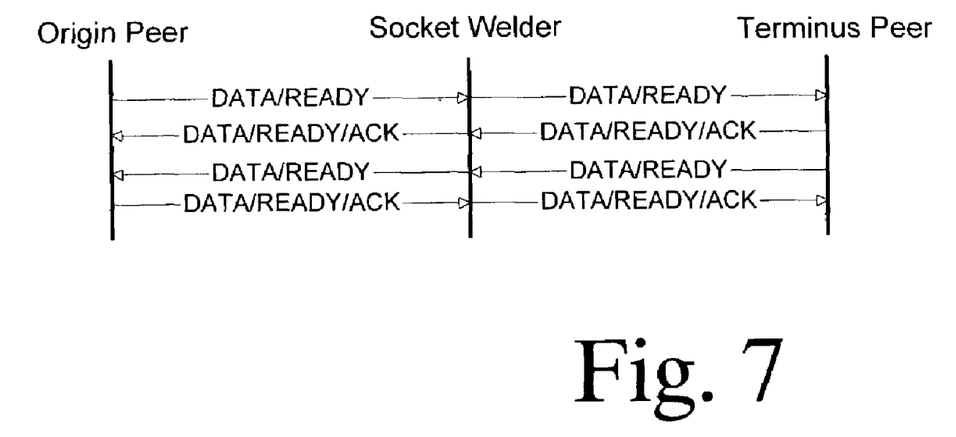

After a data channel has been spliced, the origin peer initiates an end-to-end channel handshake with the terminus peer in step 57 to ensure that the terminus has also established a connection to the socket welder and is ready to begin application layer data communications. The handshake is also used to perform additional security measures such as authentication in step 58, if needed. The data channel handshake will be a series of DATA/READY messages and acknowledgements forwarded through the socket welder as shown in FIG. 7. After the peer handshake has been completed, the peers will begin to send their data to one another in step 60 using either a BEEP channel or UDP datagrams. For BEEP transported data, the socket welder will perform IP address translation, de-multiplexing of BEEP channel data, TCP re-sequencing and window re-sizing, and fragmentation/reassembly as necessary in step 61. For UDP transported data, the socket welder will perform address translation and fragmentation/reassembly as needed.

The socket welder will continue to forward data and provide splicing services as long as the peers remain active. The spliced connection terminates in step 62, either by the socket welder sensing inactivity for a time-out period or by either peer sending a CONNECT/CLOSE message to the control module in the control channel. When the termination is sensed, the control module and socket welder exchange a CONTROL/SPLICE/STOP message identifying the reason for termination.

Figure 8:
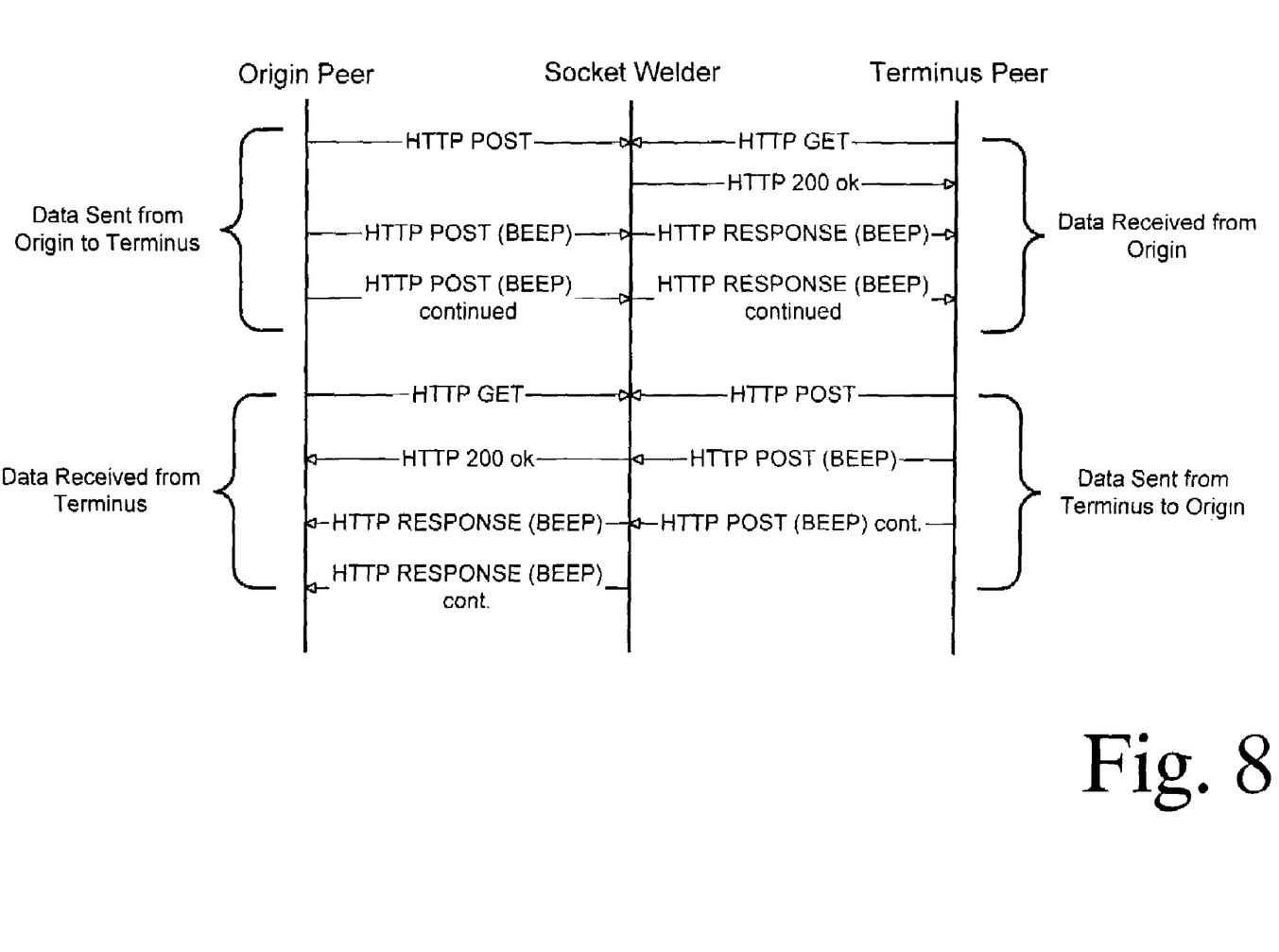

FIG. 8 shows further details of the data channel communications. The HTTP POST operation is used to send BEEP-encapsulated application data. The HTTP GET operation is used to receive BEEP-encapsulated data. In conventional usage, once a POST or GET operation is completed the HTTP connection is closed. In the present invention, the HTTP connection remains open after a POST or GET operation until the socket welding session is completed.

Figure 9:
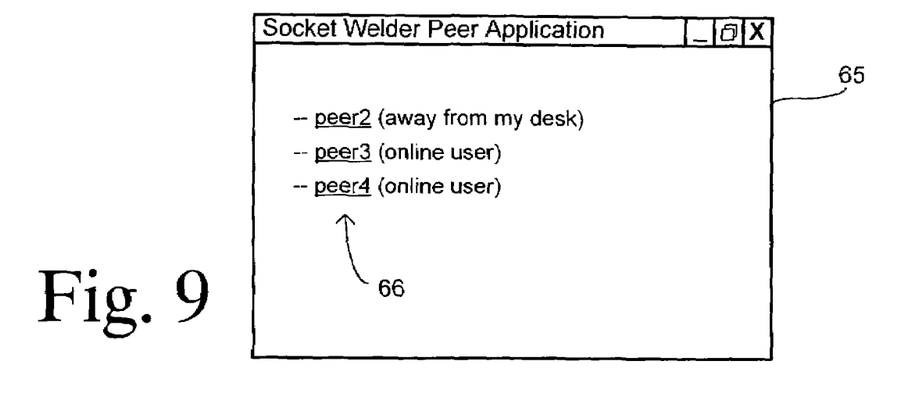
FIG. 9 shows an application window generated by a peer computer running a socket welder peer application.
Figure 10:
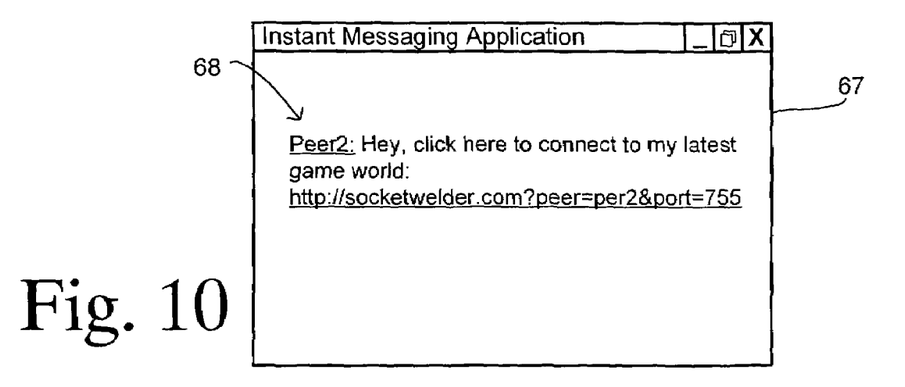
FIG. 10 shows an application window generated by a peer computer running an instant messaging application and receiving an invitation from another user to initiate a socket welder connection.

The operation of a peer computer is shown in greater detail in FIGS. 9 and 10. The peer component of the socket welding system of the present invention is comprised of a software application running on the peer's computing hardware. The basic function of the software, running as a process or daemon, is to listen for incoming CONNECT/REQUEST messages from peers and to initiate connections to peers by sending CONNECT/REQUEST messages. As shown in FIG. 9, the user interface runs in a window 65 which contains a list 66 of specified peers that are currently connected to the control module. If one of the peers makes an active connection to the control module, that peer will be shown as online or active. To make a connection to an active peer, the user selects (e.g., mouse clicks) the desired peer from the list.

When a peer receives a CONNECT/REQUEST, the software will display a pop-up notification of the impending connection. The peer user then has the option of accepting or declining the connection. In an auto-accept mode, all connections will be accepted from a predetermined list of approved peers (assuming they properly authenticate). The auto-accept mode facilitates the ability of users to connect back to their homes or enterprises while away.

The peer software also operates with conventional instant messaging and e-Mail systems for out-of-band messaging. If out-of-band messaging is configured, a peer may receive a URL containing the connection attributes of the control module and remote peer within a chat message or e-Mail message. FIG. 10 shows an instant messaging application running in a window 67, wherein an instant message 68 has been received inviting the recipient to make a spliced connection through the socket welder. By selecting a URL given in the instant message, the local peer software begins a control connection with the control module.

The peer software may either be installed locally or may be a downloadable Active-X control or Java applet. In the case of locally installed software, the peer can have persistent connections to the control module. If the software is not installed locally, it may be automatically installed when a peer receives an out-of-band message and subsequently connects to the control module. If the peer software is installed locally, the peer can also be placed in automatic connection mode. If a peer is in automatic connection mode, a preconfigured application that attempts to open a network connection can be automatically connected to a preconfigured remote peer through the socket welder. The application to remote peer mappings must be preconfigured for automatic connection to work properly.

The socket welding system of the present invention can also provide a group connection welding functionality. In this mode, multiple peers would arrange to use the socket welder together—in effect creating a temporary virtual LAN. The socket welder would act as a pseudo-router, routing BEEP data channels between the independent peer connections. This additional functionality would be reflected in the peer software to realize this feature.

The socket welder system can also provide dynamic DNS functionality. When a peer connects to the system, the socket welder will create a DNS entry for the peer's IP address using the peer's username or computer name as the hostname and the socket welder's domain as the suffix. This dynamic DNS service would allow peers to connect to the socket welder using DNS names within their applications instead of a peer's IP address.

In a further embodiment, the socket welder can provide encryption services for the data channel. This would be done either through TLS or BEEP security depending on the type of data channel. The control module communications are preferably always encrypted using TLS, to ensure that only authorized persons are using the service.

What is claimed is:

1. A method of peer-to-peer communication over a data network wherein first and second peers are coupled to said data network by respective firewalls, said method comprising the steps of:

each of said first and second peers establishing a respective persistent control connection with a socket welding control module connected within said data network;

using said persistent connections to perform respective protocol capability exchanges;

one of said first and second peers using said respective persistent control connection to request a communication channel between said peers;

said socket welding control module informing a socket welder of addresses, ports, and protocol capabilities corresponding to said peers;

said socket welding control module informing said peers of connection information corresponding to said socket welder;

each peer sending application packets through its respective firewall to said socket welder;

said socket welder modifying said application packets into a form for tunneling through said firewall of the other peer; and     said socket welder forwarding said modified application packets to the other peer.

2. The method of claim 1 wherein said modifying step is comprised of address translation and packet re-sequencing.

3. The method of claim 1 wherein said modifying step is comprised of encrypting said application packets.

4. The method of claim 1 wherein said persistent control connections employ encrypted communication.

5. The method of claim 1 wherein said step of establishing said persistent control connections includes authentication of each respective peer.

6. The method of claim 1 further comprising the step of said peer that did not request said communication channel sending an acceptance using its respective persistent control connection to said socket welding control module.

7. The method of claim 6 further comprising the step of providing authentication data of said peer requesting said communication channel to said peer accepting said request.

8. A method for routing network packets between first and second peers via a data network through at least one firewall separating at least one of said first and second peers from said data network, said method comprising the steps of:
  each of said first and second peers establishing a respective channel setup session with a control module coupled to said data network, wherein said control module determines network protocol capabilities of said peers within each respective channel setup session;
  said first peer sending a first connection request message to said control module identifying said second peer;
  said control module forwarding a second connection request message to said second peer;
  said second peer transmitting a connection accept message to said control module;
  in response to said connection accept message, said control module 1) forwarding peer information to a socket welder including data network addresses and port numbers and protocol capabilities of said first and second peers, and 2) forwarding socket welder information to said first and second peers including at least one data network address and port number corresponding to a dedicated data communication channel through said socket welder;
  said socket welder receiving network packets from each one of said first and second peers directed to said dedicated data communication channel;
  said socket welder modifying said network packets, including alteration of source and destination address and port data in said network packets; and
  forwarding said modified packets to the other one of said first and second peers.

9. The method of claim 8 wherein said modification of said network packets includes re-sequencing network packets in a TCP protocol according to the respective sequencing of network packet exchange between said socket welder and said respective first and second peers.

10. The method of claim 8 wherein said modification of said network packets includes adjusting a window size of said network packets.

11. The method of claim 8 wherein said modification of said network packets includes modifying a frame format in response to said determined network protocol capabilities.

12. The method of claim 8 wherein said modification of said network packets includes fragmentation and reassembly of said network packets.

13. The method of claim 8 wherein said modification of said network packets includes encryption of data within said network packets.

14. The method of claim 8 further comprising the step of said first peer providing an out-of-band message to said second peer having link information for establishing said persistent control connection with said control module.

15. The method of claim 14 wherein said out-of-band message is comprised of an e-mail message.

16. The method of claim 14 wherein said out-of-band message is comprised of an instant message.

17. The method of claim 8 wherein each respective channel setup session includes a series of query-response tests including test packets formatted according to predetermined protocols.

18. The method of claim 17 wherein said predetermined protocols are tested in a ranked order.

19. The method of claim 18 wherein each respective channel setup session is initiated by a respective initiation message from a respective peer to said control module, and wherein said ranked order or a respective query-response test is determined in response to a protocol of said respective initiation message.

20. The method of claim 19 wherein if said initiation message is in a TCP format, then said ranked order is comprised of TCP/BEEP followed by TCP/HTTP/BEEP.

21. The method of claim 19 wherein if said initiation message is in a UDP format, then said ranked order is comprised of UDP followed by TCP/BEEP/UDP followed by TCP/HTTP/BEEP/UDP.

22. The method of claim 8 wherein said control module maintains persistent control connections with a plurality of active peers, and wherein said method further comprises the step of said control module providing identification to each individual peer of other ones of said active peers.

23. The method of claim 8 wherein said step of establishing said persistent control connections includes authentication of each respective peer.

24. The method of claim 8 further comprising the step of said peer that did not request said communication channel sending an acceptance using its respective persistent control connection to said control module.

25. The method of claim 24 further comprising the step of providing authentication data of said peer requesting said communication channel to said peer accepting said request.

26. The method of claim 25 wherein said authentication data is provided during handshaking between said first and second peers after said communication channel is accepted.

27. Apparatus for routing network packets between first and second peers via a data network, said apparatus comprising:
  a control module coupled to said data network and having a first predetermined data network address; and
  a socket welder coupled to said control module and to said data network, said socket welder having a second predetermined data network address;
  said control module 1) accepting first and second channel setup sessions initiated to said first predetermined data network address by said first and second peers, respectively, for determining network protocol capabilities of said first and second peers, 2) processing a first connection request message from said first peer for connecting with said second peer, 3) forwarding a second connection request message to said second peer, 4) if said second peer responds with a connection accept message then sending peer information to said socket welder including data network addresses and port numbers and protocol capabilities of said first and second peers and sending socket welder information to said first and second peers including at least one data network address and port number corresponding to a dedicated data communication channel through said socket welder;

said socket welder receiving network packets from each one of said first and second peers directed to said dedicated data communication channel and modifying said network packets for forwarding to the other one of said first and second peers.

28. A network server for coupling within a data network and comprising a program including a control module and a socket welder module for performing the steps of:

establishing respective persistent control connections with a plurality of peers connected within said data network;

using said persistent connections to perform respective protocol capability exchanges with said peers;

receiving a request via a respective persistent control connection from one of said peers for a communication channel between at least two of said peers;

said control module informing said socket welder module of addresses, ports, and protocol capabilities corresponding to said peers;

said control module informing said peers of connection information corresponding to said socket welder;

said socket welder module receiving application packets from said peers; and said socket welder module modifying application packets from one peer into a form for tunneling through a firewall of another peer; and said socket welder forwarding said modified application packets to said another peer.

* * * * *